United States Patent
Kim et al.

(10) Patent No.: US 10,770,236 B2
(45) Date of Patent: Sep. 8, 2020

(54) MULTILAYER CERAMIC ELECTRONIC COMPONENT ARRAY

(71) Applicant: SAMSUNG ELECTRO-MECHANICS CO., LTD., Suwon-si, Gyeonggi-do (KR)

(72) Inventors: Ki Young Kim, Suwon-si (KR); Beom Joon Cho, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 8 days.

(21) Appl. No.: 16/201,607

(22) Filed: Nov. 27, 2018

(65) Prior Publication Data

US 2020/0118763 A1 Apr. 16, 2020

(30) Foreign Application Priority Data

Oct. 10, 2018 (KR) .......... 10-2018-0120632

(51) Int. Cl.
*H01G 4/38* (2006.01)
*H01G 4/248* (2006.01)
(Continued)

(52) U.S. Cl.
CPC .............. *H01G 4/38* (2013.01); *H01G 4/232* (2013.01); *H01G 4/248* (2013.01); *H01G 4/1227* (2013.01); *H01G 4/30* (2013.01)

(58) Field of Classification Search
CPC .......... H01G 4/38; H01G 4/232; H01G 4/248; H01G 4/1227; H01G 4/30
See application file for complete search history.

(56) References Cited

U.S. PATENT DOCUMENTS 5,870,273 A * 2/1999 Sogabe .............. H01G 4/40
361/306.3
6,046,902 A * 4/2000 Nakagawa .......... H01G 4/228
361/306.1
(Continued)

FOREIGN PATENT DOCUMENTS

JP H11-219847 A 8/1999
JP 2000-082636 A 3/2000
(Continued)

OTHER PUBLICATIONS

Notice of Reason for Rejection dated Dec. 17, 2019 in Korean Patent Application No. 10-2018-0120632 (With English Translation).

*Primary Examiner* — Dion Ferguson
(74) *Attorney, Agent, or Firm* — Morgan, Lewis & Bockius LLP (57) ABSTRACT

A multilayer ceramic electronic component array includes: a plurality of multilayer ceramic electronic components; a first terminal structure electrically connected to first external electrodes of each of the plurality of multilayer ceramic electronic components; a second terminal structure electrically connected to second external electrodes of each of the plurality of multilayer ceramic electronic components; a first conductive bonding member bonding the first external electrodes of each of the plurality of multilayer ceramic electronic components and the first terminal structure; a second conductive bonding member bonding the second external electrodes of each of the plurality of multilayer ceramic electronic components and the second terminal structure; and a ceramic bonding member contacting first surfaces of each of the ceramic bodies of each of the plurality of multilayer ceramic electronic components and disposed to extend to second surfaces of each of the ceramic bodies.

12 Claims, 8 Drawing Sheets

(51) Int. Cl.
    *H01G 4/232*     (2006.01)
    *H01G 4/30*     (2006.01)
    *H01G 4/12*     (2006.01)

(56) References Cited

U.S. PATENT DOCUMENTS

| | | | | |
|---|---|---|---|---|
| 6,181,544 | B1* | 1/2001 | Nakagawa | H01G 4/228 |
| | | | | 361/306.1 |
| 6,310,759 | B2* | 10/2001 | Ishigaki | H01G 4/232 |
| | | | | 361/309 |
| 6,388,864 | B1* | 5/2002 | Nakagawa | H01G 2/14 |
| | | | | 361/306.3 |
| 6,433,992 | B2* | 8/2002 | Nakagawa | H01G 4/38 |
| | | | | 361/301.4 |
| 9,313,876 | B2* | 4/2016 | Dogauchi | H05K 1/0216 |
| 9,865,399 | B2* | 1/2018 | Cho | H01G 4/012 |
| 2013/0343027 | A1* | 12/2013 | Perea | H01C 1/14 |
| | | | | 361/813 |
| 2016/0205769 | A1* | 7/2016 | Park | H01G 4/224 |
| | | | | 174/260 |
| 2018/0122578 | A1* | 5/2018 | Choi | H01G 2/06 |

FOREIGN PATENT DOCUMENTS

| | | |
|---|---|---|
| JP | 2011-204795 A | 10/2011 |
| JP | 2013-175512 A | 9/2013 |
| WO | 2013/088546 A1 | 6/2013 |

* cited by examiner

MULTILAYER CERAMIC ELECTRONIC COMPONENT ARRAY

CROSS-REFERENCE TO RELATED APPLICATION

This application claims the benefit of priority to Korean Patent Application No. 10-2018-0120632 filed on Oct. 10, 2018 in the Korean Intellectual Property Office, the disclosure of which is incorporated herein by reference in its entirety.

TECHNICAL FIELD

The present disclosure relates to a multilayer ceramic electronic component array.

BACKGROUND

A multilayer ceramic electronic component has been widely used as as a component of an information technology (IT) device such as a computer, a personal digital assistant (PDA), a cellular phone, or the like, since it has a small size, implements high capacitance, and may be easily mounted, and has also been widely used as an electrical component since it has high reliability and high strength characteristics.

In recent years, multilayer ceramic electronic components have been widely used as electrical components, and thus a structure in which the plurality of multilayer ceramic electronic components are arranged has been widely used. The structure in which the plurality of multilayer ceramic electronic components are arranged requires a higher degree of structural stability.

SUMMARY

An aspect of the present disclosure may provide a multilayer ceramic electronic component array capable of suppressing misalignment by having high structural stability.

According to an aspect of the present disclosure, a multilayer ceramic electronic component array may include; a plurality of multilayer ceramic electronic components including a ceramic body including a dielectric layer and first and second internal electrodes stacked so as to be alternately exposed to first and second outer surfaces with the dielectric layer interposed therebetween and first and second external electrodes disposed on the first and second outer surfaces of the ceramic body so as to be connected to corresponding internal electrodes among the first and second internal electrodes, respectively; a first terminal structure electrically connected to the first external electrodes of each of the plurality of multilayer ceramic electronic components; a second terminal structure electrically connected to the second external electrodes of each of the plurality of multilayer ceramic electronic components; a first conductive bonding member bonding the first external electrodes of each of the plurality of multilayer ceramic electronic components and the first terminal structure; a second conductive bonding member bonding the second external electrodes of each of the plurality of multilayer ceramic electronic components and the second terminal structure; and a ceramic bonding member contacting first surfaces of each of the ceramic bodies of each of the plurality of multilayer ceramic electronic components and disposed to extend to second surfaces of each of the ceramic bodies.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

Figure 1:
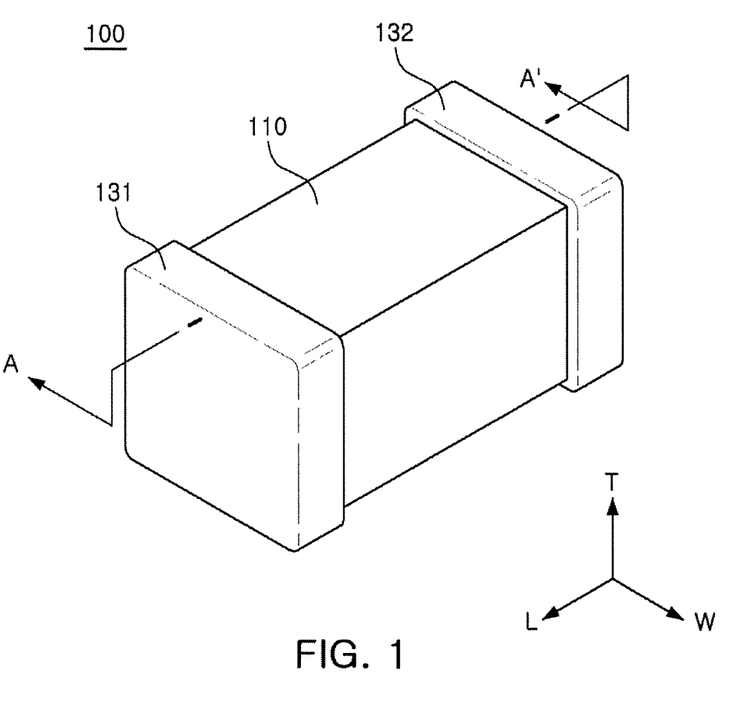
FIG. 1 is a perspective view showing a multilayer ceramic electronic component included in a multilayer ceramic electronic component array according to an exemplary embodiment of the present disclosure and a mounting thereof.

FIG. 1 is a perspective view showing a multilayer ceramic electronic component according to an exemplary embodiment of the present disclosure and a mounting thereof.

Referring to FIG. 1, a multilayer ceramic electronic component 100 according to an exemplary embodiment of the present disclosure may include a ceramic body 110 and first and second external electrodes 131 and 132, in which the multilayer ceramic electronic component 100 may be mounted on first and second electrode pads on a board.

The ceramic body 110 may be formed of a hexahedron having opposite end surfaces in a length direction L, opposite side surfaces in a width direction W, and opposite side surfaces in a thickness direction T. The ceramic body 110 may be formed by stacking a plurality of dielectric layers ill in the thickness direction T and then sintering the plurality of dielectric layers 111. A shape and a dimension of the ceramic body 110 and the number (one or more) of stacked dielectric layers 111 are not limited to those illustrated in the present exemplary embodiment.

The plurality of dielectric layers disposed in the ceramic body 110 may be in a sintered state, and adjacent dielectric layers may be integrated with each other so that boundaries therebetween are not readily apparent without using a scanning electron microscope (SEM).

For example, the ceramic body 110 may have a form in which eight corners of the hexahedron are round. Therefore, durability and reliability of the ceramic body 110 may be improved, and structural reliability of the first and second external electrodes 131 and 132 at the corners may be improved.

The dielectric layer may have a thickness arbitrarily changed in accordance with a capacitance design of the multilayer ceramic electronic component 100, and may include ceramic powders having a high dielectric constant, such as barium titanate ($BaTiO_3$) based powders or strontium titanate ($SrTiO_3$) based powders. However, a material of the dielectric layer according to the present disclosure is not limited thereto. In addition, various ceramic additives, organic solvents, plasticizers, binders, dispersants, and the like, may be added to the ceramic powders according to an object of the present disclosure.

An average particle size of the ceramic powders used to form the dielectric layer is not particularly limited, and may be controlled in order to accomplish an object of the present disclosure. For example, the average particle size of the ceramic powders used to form the dielectric layer 111 may be controlled to be 400 nm or less. Therefore, the multilayer ceramic electronic component 100 according to an exemplary embodiment in the present disclosure may be used as a component that needs to be miniaturized and have a high capacitance, such as an information technology (IT) component.

For example, the dielectric layers 111 may be formed by applying and then drying slurry including powders such as barium titanate ($BaTiO_3$) powders, or the like, to carrier films to prepare a plurality of ceramic sheets. The ceramic sheets may be formed by mixing ceramic powders, a binder, and a solvent with one another to prepare slurry and manufacturing the slurry in a sheet shape having a thickness of several micrometers by a doctor blade method, but are not limited thereto.

The first and second external electrodes 131 and 132 may be disposed on outer surfaces (for example, one surface and the other surface in the length direction) of the ceramic body 110 to be connected to the first and second internal electrodes, respectively, and may be configured to electrically connect the first and second internal electrodes 121 and 122 and a board to each other.

For example, the first and second external electrodes 131 and 132 may be formed of copper (Cu), palladium (Pd), platinum (Pt), gold (Au), silver (Ag), lead (Pb) or the like, or alloys thereof.

For example, the first and second external electrodes 131 and 132 may include first and second electrode layers including Cu or Ni and first and second plating layers disposed on the first and second electrode layers and including Ni or Sn.

The first and second electrode layers may be formed by a method of dipping the ceramic body 110 in a paste including a metal component or a method of printing a conductive paste including a conductive metal on at least one surface of the ceramic body 110 in the thickness direction T, and may also be formed by a sheet transfer method or a pad transfer method.

The first and second plating layers may be formed by sputtering or an electric deposition, but the first and second plating layers are not limited by the above methods.

Figure 2:
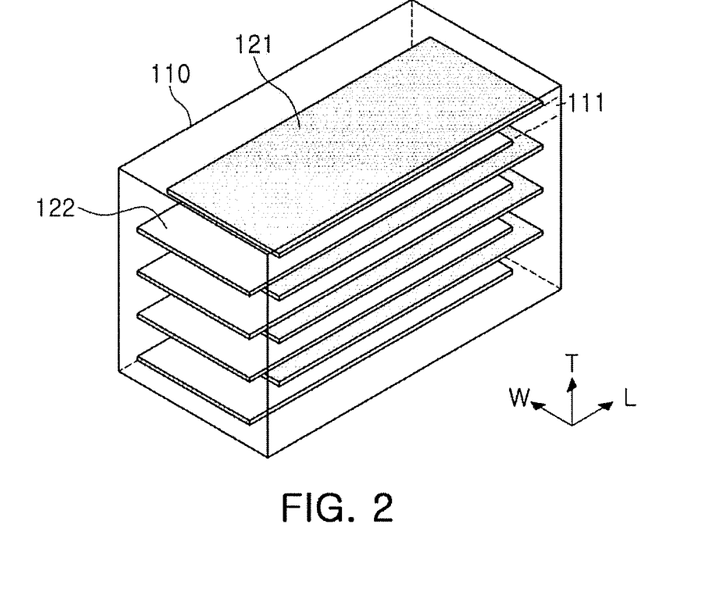
FIG. 2 is a perspective view showing a shape of internal electrodes of the multilayer ceramic electronic component shown in FIG. 1.

FIG. 2 is a perspective view showing a form of an internal electrode of the multilayer ceramic electronic component according to the exemplary embodiment of the present disclosure.

Referring to FIG. 2, the ceramic body 110 may include the first and second internal electrodes 121 and 122, and the dielectric layer 111 disposed between the first and second internal electrodes 121 and 122.

The first and second internal electrodes 121 and 122 are stacked so as to be alternately exposed to the first and second outer surfaces (for example, one end surface and the other end surface in the length direction) with the dielectric layer 111 interposed therebetween so as to have different polarities.

The first internal electrodes 121 and the second internal electrodes 122 may be formed to be alternately exposed to one end surface and the other end surface of the ceramic body 110 in the length direction L of the ceramic body 110 in the stack direction of the dielectric layers 111 by printing a conductive paste including a conductive metal, and may be electrically insulated from each other by each of the dielectric layers 111 disposed therebetween.

That is, the first and second internal electrodes 121 and 122 may be electrically connected to the first and second external electrodes 131 and 132 formed on opposite end surfaces of the ceramic body 110 in the length direction L of the ceramic body 110 through portions alternately exposed to the opposite end surfaces of the ceramic body 110 in the length direction of the ceramic body 110, respectively.

For example, the first and second internal electrodes 121 and 122 may have an average particle size of 0.1 to 0.2 µm, and may be formed of a conductive paste for an internal electrode including 40 to 50 wt % of conductive metal powders, but are not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body 110.

Therefore, when voltages are applied to the first and second external electrodes, electric charges may be accumulated between the first and second internal electrodes 121 and 122 facing each other. In this case, a capacitance of the multilayer ceramic electronic component 100 may be in proportion to an area of a region in which the first and second internal electrodes 121 and 122 overlap each other.

That is, when the area of the region in which the first and second internal electrodes 121 and 122 overlap each other is significantly increased, a capacitance may be significantly increased even in a capacitor having the same size.

Thicknesses of the first and second internal electrodes 121 and 122 may be determined depending on the purpose, and may be, for example, 0.4 µm or less. In addition, the number of layers of the first and second internal electrodes 121 and 122 may be 400 or more. Therefore, the multilayer ceramic electronic component 100 may be used as a component that needs to be miniaturized and have a high capacitance, such as an information technology (IT) component.

Since the thickness of the dielectric layer 111 corresponds to an interval between the first and second internal electrodes 121 and 122, the smaller the thickness of the dielectric layer 111, the greater the capacitance of the multilayer ceramic electronic component 100.

The conductive metal included in the conductive paste forming the first and second internal electrodes 121 and 122 may be nickel (Ni), copper (Cu), palladium (Pd), silver (Ag), lead (Pb), or platinum (Pt), or alloys thereof. However, the conductive metal according to the present disclosure is not limited thereto.

The larger the interval between the first and second internal electrodes 121 and 122, the more the withstand voltage characteristics of the ceramic body 110 may be improved.

When the multilayer ceramic electronic component 100 requires high withstand voltage characteristics such as electrical components, the multilayer ceramic electronic component 100 may be designed so that an average thickness of the dielectric layers 111 is twice as large as that of the first and second internal electrodes 121 and 122. Accordingly, the multilayer ceramic electronic device 100 may have the high withstand voltage characteristics so as to be used as electrical components.

In addition, the durability (for example, warpage endurance) of the ceramic body 110 may have high reliability when the width of the ceramic body 110 exceeds 0.5 times the thickness thereof.

Figure 3A:
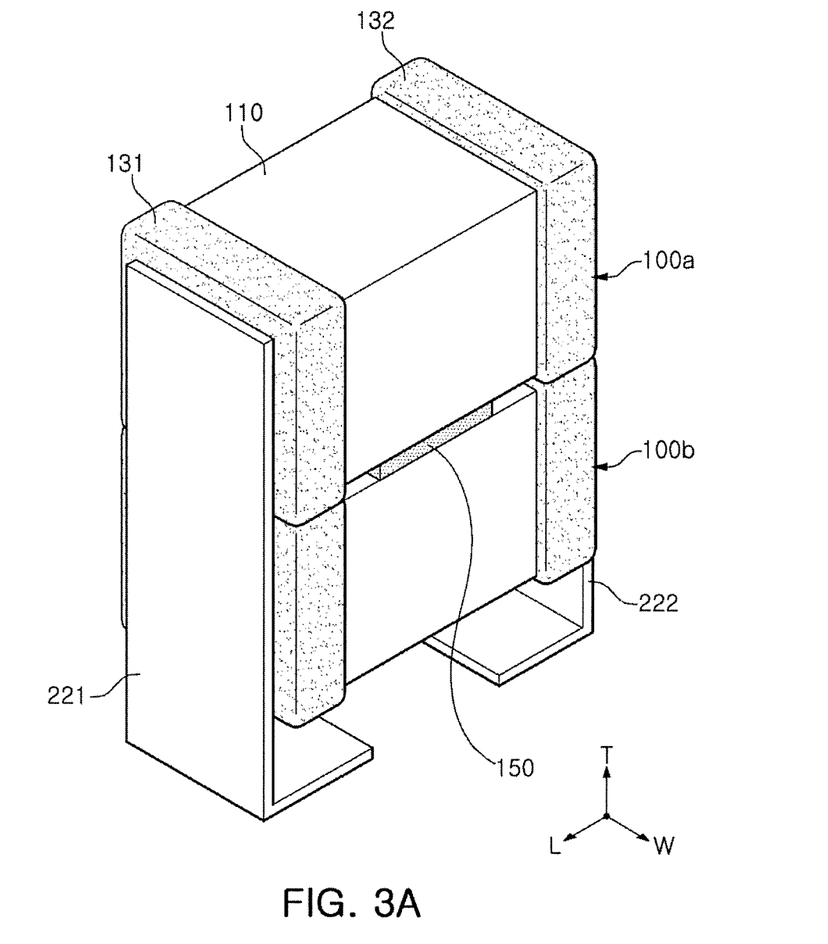
FIG. 3A is a perspective view showing an arrangement of the multilayer ceramic electronic component shown in FIG. 1.
Figure 3B:
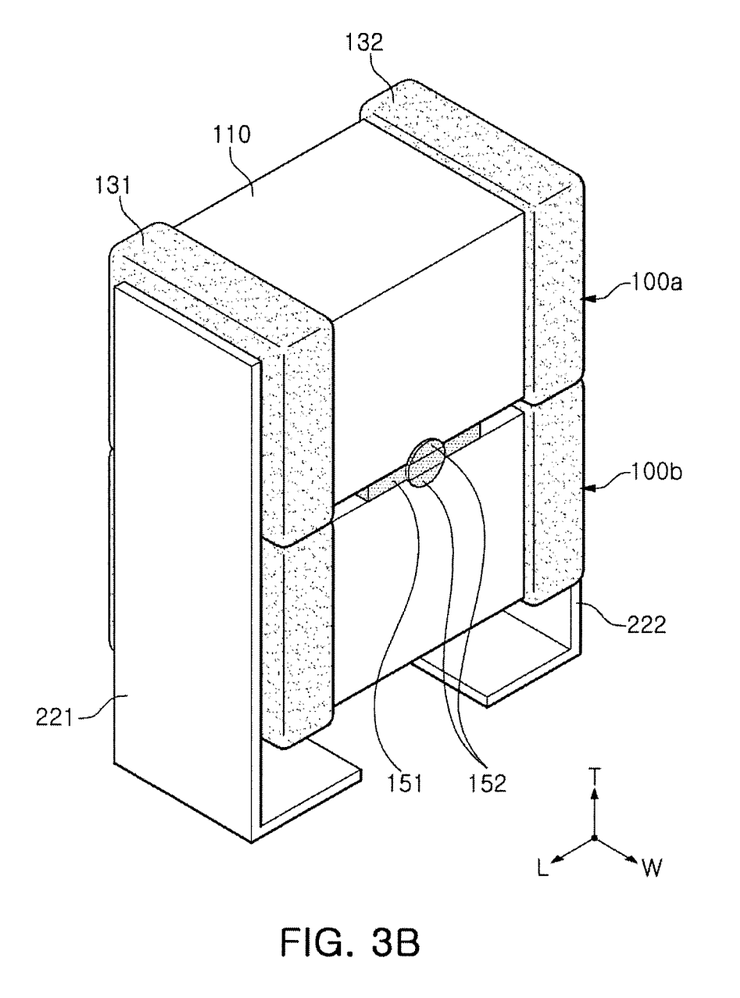
FIG. 3B is a perspective view showing of a multilayer ceramic electronic component array according to the exemplary embodiment in the present disclosure.

FIG. 3A is a perspective view showing an arrangement of a multilayer ceramic electronic component shown in FIG. 1, and FIG. 3B is a perspective view showing a multilayer ceramic electronic component array according to an embodiment of the present disclosure.

Figure 4A:
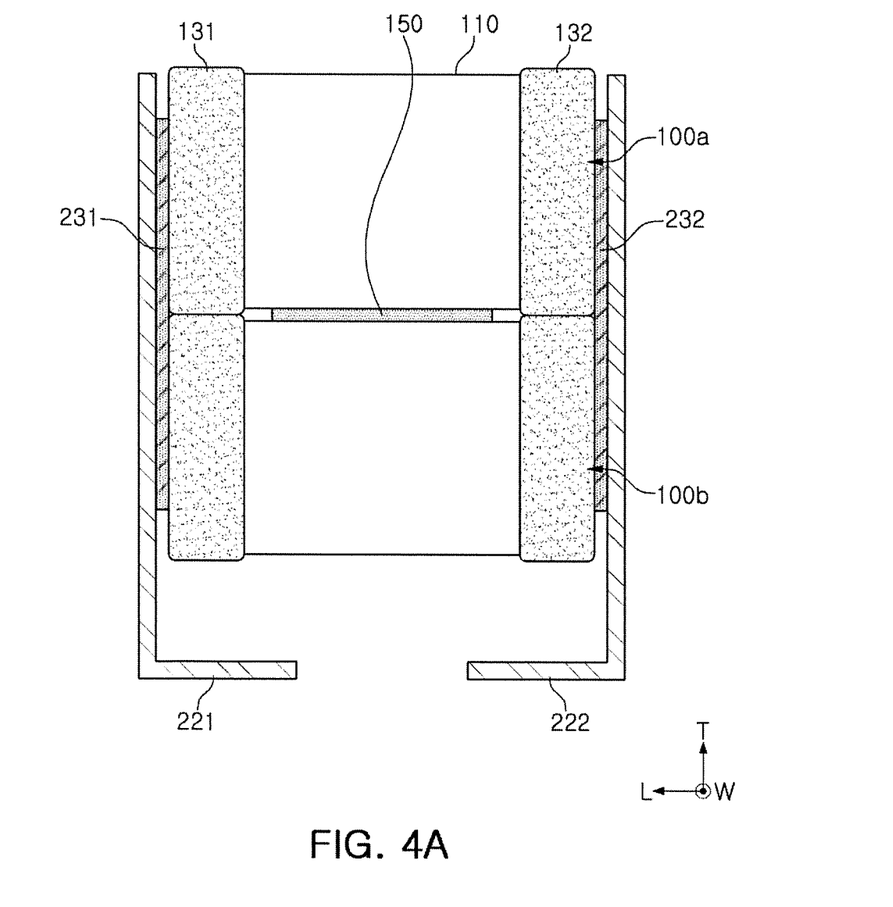
FIG. 4A is a side view showing a base region of a ceramic bonding member in the multilayer ceramic electronic component array according to the exemplary embodiment of the present disclosure.
Figure 4B:
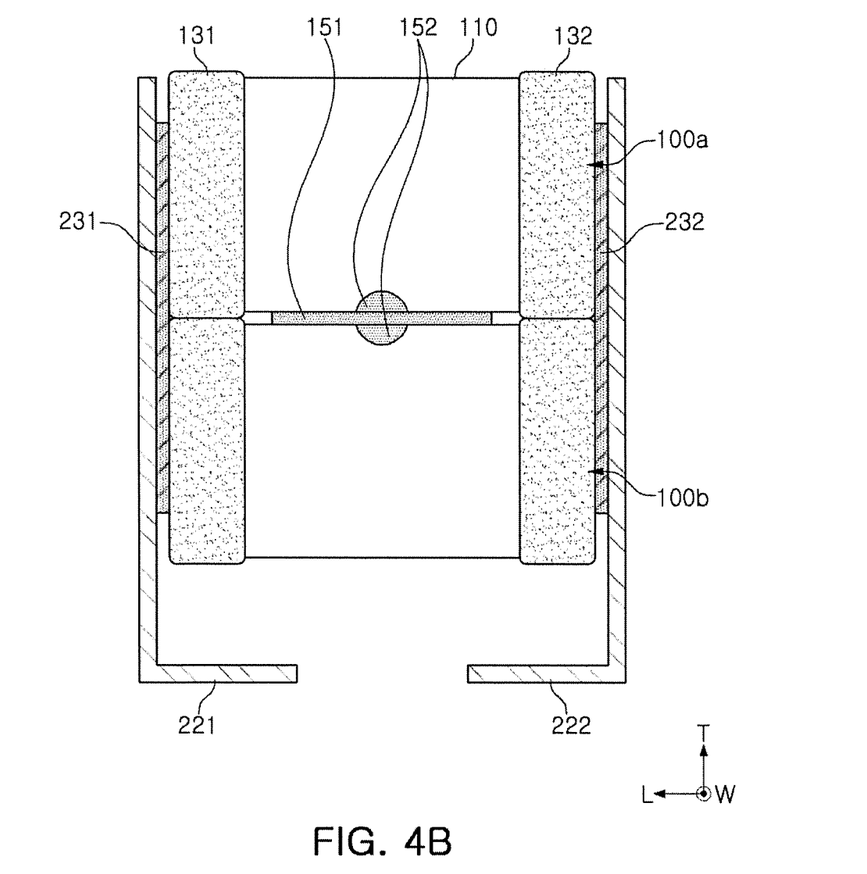
FIG. 4B is a side view showing an extended region of the ceramic bonding member in the multilayer ceramic electronic component array according to the exemplary embodiment of the present disclosure.

FIG. 4A is a side view showing a base region of a ceramic bonding member in the multilayer ceramic electronic component array according to the exemplary embodiment of the present disclosure, and FIG. 4B is a side view showing an extended region of the ceramic bonding member in the multilayer ceramic electronic component array according to the exemplary embodiment of the present disclosure.

Referring to FIGS. 3A, 3B, 4A and 4B, the multilayer ceramic electronic component array according to an embodiment of the present disclosure may include a plurality of multilayer ceramic electronic components 100a and 100b, a first terminal structure 221, a second terminal structure 222, a first conductive bonding member 231, a second conductive bonding member 232, and a ceramic bonding member 150, in which the ceramic bonding member 150 may include a base region 151 and an extended region 152.

The plurality of multilayer ceramic electronic components 100a and 100b may be designed in the same manner as the multilayer ceramic electronic components shown in FIGS. 1 and 2.

For example, the plurality of multilayer ceramic electronic components 100a and 100b may be arranged so that the first and second external electrodes 131 and 132 contact each other. As a result, a force applied to the plurality of multilayer ceramic electronic components 100a and 100b may be dispersed by the plurality of multilayer ceramic electronic components 100a and 100b in a balance manner, and therefore the multilayer ceramic electronic component array may have stronger durability against the external environment (for example, impact and heat).

For example, the plurality of multilayer ceramic electronic components 100a and 100b may be arranged in a thickness direction so that a direction perpendicular to second surfaces of each of the ceramic bodies 110 is a width direction. Accordingly, the first and second terminal structures 221 and 222 may be pressed more strongly to the bottom surface (for example, substrate, interposer), such that acoustic noise reduction efficiency may be improved.

The first terminal structure 221 may be electrically connected to the first external electrodes 131 of each of the plurality of multilayer ceramic electronic components 100a and 100b.

The second terminal structure 222 may be electrically connected to the second external electrodes 132 of each of the plurality of multilayer ceramic electronic components 100a and 100b.

As a result, an arrangement efficiency of the multilayer ceramic electronic component may be improved, such that total capacitance-to-total size of the multilayer ceramic electronic component array may be reduced.

In addition, since the plurality of multilayer ceramic electronic components 100a and 100b may be separated from a bottom surface (for example, substrate, interposer) by the first and second terminal structures 221 and 222, a substantial influence of the acoustic noise may be reduced and an influence of the bottom environment (for example, heat generation of the substrate, electrical noise) on the plurality of multilayer ceramic electronic components 100a and 100b may be reduced.

For example, a part of the first terminal structure 221 may have a shape bent toward the second terminal structure 222, and a part of the second terminal structure 222 may have a shape bent toward the first terminal structure 221. Accordingly, the structural stability of the multilayer ceramic electronic component array may be improved, and the influence of the bottom surface environment on the plurality of multilayer ceramic electronic components 100a and 100b may be further reduced.

For example, the first and second terminal structures 221 and 222 may be separated from each of the plurality of multilayer ceramic electronic components 100a and 100b. Accordingly, the influence of the bottom surface environment on the plurality of multilayer ceramic electronic components 100a and 100b may be further reduced.

Meanwhile, the first and second terminal structures 221 and 222 may be formed of the same material as the first and second external electrodes 131 and 132, but may vary depending on the design.

The first conductive bonding member 231 may bond the first external electrodes 131 of each of the plurality of multilayer ceramic electronic components 100a and 100b to the first terminal structure 221.

The second conductive bonding member 232 may bond the second external electrodes 132 of each of the plurality of multilayer ceramic electronic components 100a and 100b to the second terminal structure 222.

For example, the first and second conductive bonding members 231 and 232 may be configured to have adhesive properties like solder during the manufacturing process or may be configured to have adhesive properties as a metal material is contained in the adhesive, but are not limited thereto.

The plurality of multilayer ceramic electronic components 100a and 100b are separated upward from portions contacting the bottom surface in the first and second terminal structures 221 and 222 due to the first and second conductive bonding members 231 and 232.

The first and second conductive bonding members 231 and 232 may be disposed on the first and second external electrodes 131 and 132 of the plurality of multilayer ceramic electronic components 100a and 100b during the arrangement of the plurality of multilayer ceramic electronic components 100a and 100b.

The first and second conductive bonding members 231 and 232 may have fluidity at the beginning of the arrangement process and may have fluidity by heat even after the arrangement process.

Accordingly, the plurality of multilayer ceramic electronic components 100a, 100b may be misaligned.

For example, the plurality of multilayer ceramic electronic components 100a and 100b may be shifted in the width direction according to the fluidity of the first and second conductive bonding members 231 and 232. That is, a part of the plurality of multilayer ceramic electronic components 100a and 100b may advance or retreat in the width direction.

For example, the plurality of multilayer ceramic electronic components 100a and 100b may rotate in the width direction according to the fluidity of the first and second conductive bonding members 231 and 232. That is, one of the plurality of multilayer ceramic electronic components 100a and 100b may be arranged so that the first external electrode advances in the width direction and the second external electrode retreats in the width direction.

As such, when the plurality of multilayer ceramic electronic components 100a and 100b are misaligned, the durability and operational reliability of the multilayer ceramic electronic component array may be reduced, and at least a part of the plurality of multilayer ceramic electronic components 100a and 100b may flow down with a reduction in a bonding area of the first and second conductive bonding members 231 and 232. In addition, when the multilayer ceramic electronic component array is mounted on the bottom surface (for example, a substrate or an interposer), a bonding area between the solders is reduced according to the misalignment of the plurality of multilayer ceramic electronic components 100a and 100b, such that the plurality of multilayer ceramic electronic components 100a and 100b may flow down during a high temperature process.

The base region 151 of the ceramic bonding member 150 contacts the first surface of each of the ceramic bodies 110 of the plurality of multilayer ceramic electronic components 100a and 100b.

The ceramic bonding member 150 of the multilayer ceramic electronic component array according to the exemplary embodiment of the present disclosure may further include the extended region 152 extending on the second surfaces of each of the ceramic bodies 110.

The ceramic bonding member 150 including the extended region 152 may provide a reaction force when the plurality of multilayer ceramic electronic components 100a and 100b are shifted and/or rotated according to the fluidity of the first and second conductive bonding members 231 and 232.

Accordingly, the plurality of multilayer ceramic electronic components 100a, 100b may be suppressed from being misaligned.

For example, the ceramic bonding member 150 may include the extended region 152 disposed at the center of the second surfaces of each of the ceramic bodies 110 in the length direction. As a result, the plurality of multilayer ceramic electronic components 100a and 100b may be suppressed from being shifted in the width direction according to the fluidity of the first and second conductive bonding members 231 and 232.

In the case in which the area of the ceramic bonding member 150 contacting the first surfaces of each of the ceramic bodies 110 is defined as A and the area of the ceramic bonding member 150 contacting the second surfaces of each of the ceramic bodies 110 is defined as B, the frequency at which the multilayer ceramic electronic component is separated when a part of the multilayer ceramic electronic component 100a is applied with a load in the width direction at a speed of 1 mm/min for 10 seconds may be summarized as the following Table 1 depending on a ratio of A and B. In all cases, the total amount of the ceramic bonding members 150 is the same.

TABLE 1

| A/B | | 1 | 1.02 | 1.05 | 1.1 | 1.2 | 1.5 |
|---|---|---|---|---|---|---|---|
| Applied load | 20N | 2/10 | 1/10 | 0/10 | 0/10 | 0/10 | 0/10 |
| | 30N | 4/10 | 2/10 | 0/10 | 0/10 | 0/10 | 0/10 |

Referring to the above Table 1, the multilayer ceramic electronic component array may have a high sticking force when A/B is 1.05 or less.

Figure 4C:
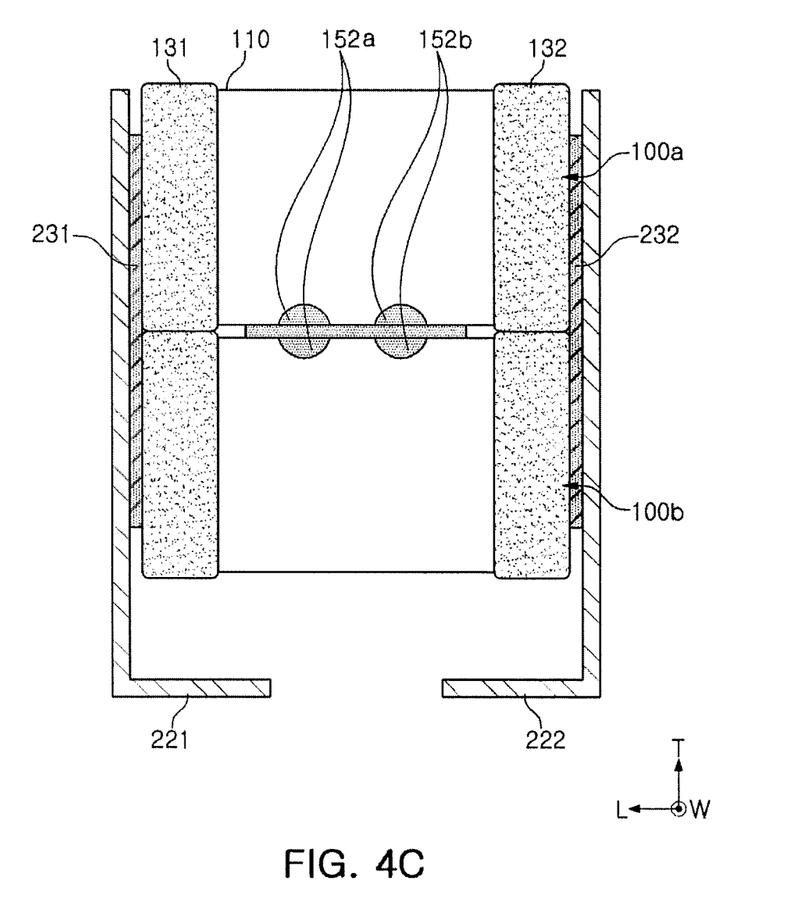
FIG. 4C is a side view showing first and second extended regions of the ceramic bonding member in the multilayer ceramic electronic component array according to the exemplary embodiment of the present disclosure.

FIG. 4C is a side view showing first and second extended regions of the ceramic bonding member in the multilayer ceramic electronic component array according to the exemplary embodiment of the present disclosure.

Referring to FIG. 4C, the ceramic bonding member 150 may include a first extended region 152a disposed to be biased to one end surface of the second surfaces of each of the ceramic bodies 110 in the length direction and a second extended region 152b disposed to be biased in the other end surface thereof in the length direction.

As a result, the plurality of multilayer ceramic electronic components 100a and 100b may be suppressed from rotating in the width direction according to the fluidity of the first and second conductive bonding members 231 and 232.

On the other hand, the first conductive bonding member 231 may be configured to contact only a surface of the first terminal structure 221 in the length direction and a surface of the first external electrode 131 in the length direction, and the second conductive bonding member 232 may be configured to contact only a surface of the second terminal structure 222 in the length direction and a surface of the second external electrode 132 in the length direction.

Figure 4D:
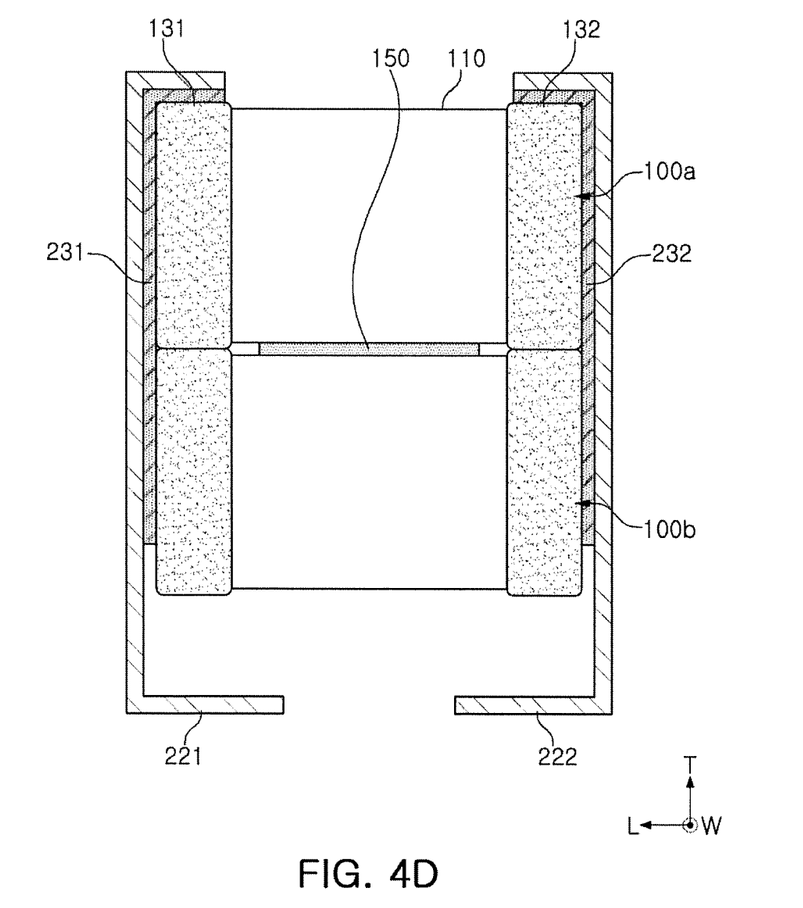
FIG. 4D is a side view showing a modified structure of first and second terminal structures of the multilayer ceramic electronic component array according to the exemplary embodiment of the present disclosure.

FIG. 4D is a side view showing a modified structure of first and second terminal structures of the multilayer ceramic electronic component array according to the exemplary embodiment of the present disclosure.

Referring to FIG. 4D, the first conductive bonding member 231 may be configured to contact not only the surface of the first external electrode 131 in the length direction but also an upper surface of the first external electrode 131, and the second conductive bonding member 232 may be configured to contact not only the end of the second external electrode 132 in the length direction but also an upper surface of the second external electrode 132.

Figure 5:
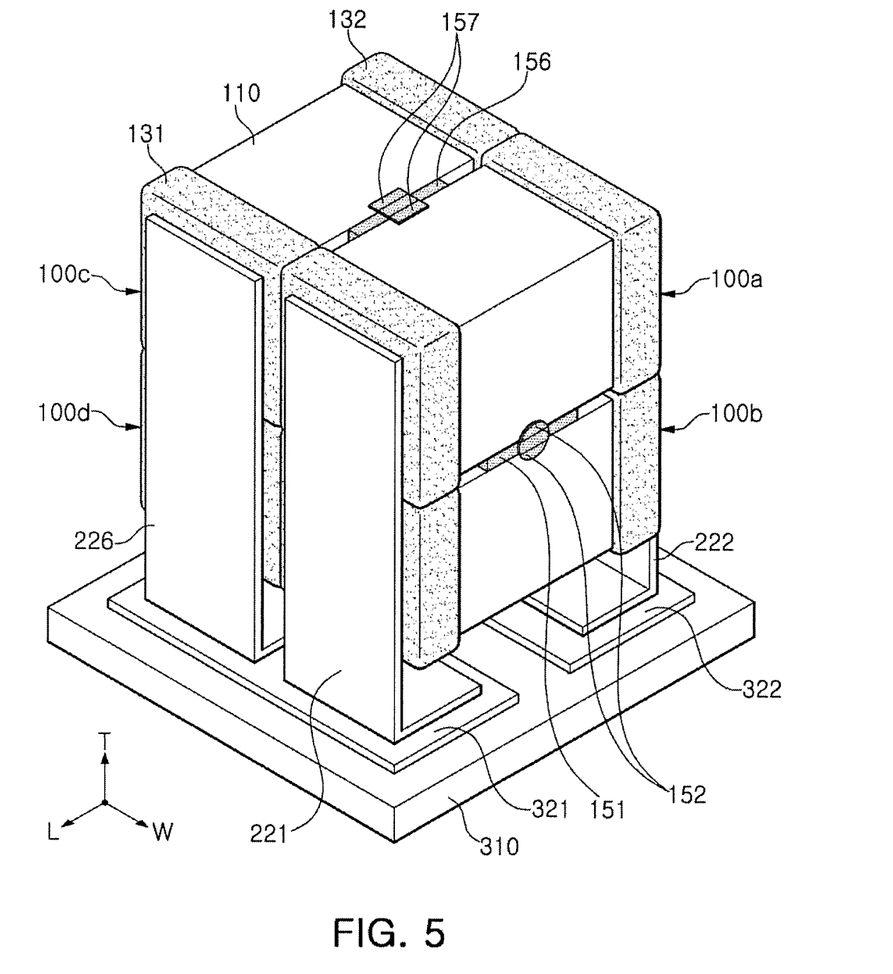
FIG. 5 is a perspective view showing a modified arrangement structure of the multilayer ceramic electronic component array according to the exemplary embodiment in the present disclosure.

FIG. 5 is a perspective view showing a modified arrangement structure of the multilayer ceramic electronic component array according to the exemplary embodiment in the present disclosure.

Referring to FIG. 5, the multilayer ceramic electronic component array according to the exemplary embodiment of the present disclosure may include n×m multilayer ceramic electronic components 100a, 100b, 100c, and 100d. Here, the multilayer ceramic electronic components 100a, 100b, 100c, and 100d may be arranged in n numbers in the thickness direction and the multilayer ceramic electronic components 100a, 100b, 100c, and 100d may be arranged in m numbers in the width direction.

Accordingly, the arrangement efficiency of the multilayer ceramic electronic components 100a, 100b, 100c, and 100d can be further improved, such that the total capacitance-tototal size of the multilayer ceramic electronic component array may be further reduced.

Further, the multilayer ceramic electronic component array according to the exemplary embodiment of the present disclosure may further include a second ceramic bonding member which contacts each third surface of each of the ceramic bodies 110 of each of the multilayer ceramic electronic components arranged in the width direction among the plurality of multilayer ceramic electronic components 100a, 100b, 100c, and 100d and is disposed to extend to fourth surfaces of each of the ceramic bodies 110. That is, the second ceramic bonding member may include a second base region 156 contacting the third surface of the ceramic body 110 and a second extended region 157 contacting the fourth surface of the ceramic body 110.

Accordingly, the misalignment of the multilayer ceramic electronic components 100a, 100b, 100c, and 100d can be further suppressed.

Referring to FIG. 5, the multilayer ceramic electronic component array according to the exemplary embodiment of the present disclosure may further include a third terminal structure 226 and a fourth terminal structure.

The first to fourth terminal structures may be mounted on first and second electrode pads 321 and 322 on a substrate 310.

As set forth above, according to the exemplary embodiment in the present disclosure, the multilayer ceramic electronic component array may suppress the misalignment by having the high structural stability.

While exemplary embodiments have been shown and described above, it will be apparent to those skilled in the art that modifications and variations could be made without departing from the scope of the present invention as defined by the appended claims.

What is claimed is:

1. A multilayer ceramic electronic component array comprising:
   a plurality of multilayer ceramic electronic components each including a ceramic body including a dielectric layer and first and second internal electrodes stacked with the dielectric layer interposed therebetween, the first and second internal electrodes being alternately exposed to first and second outer surfaces, respectively, and first and second external electrodes disposed on the first and second outer surfaces of the ceramic body and electrically connected to the first and second internal electrodes, respectively;
   a first terminal structure electrically connected to first external electrodes of the plurality of multilayer ceramic electronic components;
   a second terminal structure electrically connected to second external electrodes of the plurality of multilayer ceramic electronic components;
   a first conductive bonding member bonding the first external electrodes of the plurality of multilayer ceramic electronic components and the first terminal structure;
   a second conductive bonding member bonding the second external electrodes of the plurality of multilayer ceramic electronic components and the second terminal structure; and
   a first ceramic bonding member contacting first surfaces of ceramic bodies of the plurality of multilayer ceramic electronic components and extending onto second surfaces of the ceramic bodies.

2. The multilayer ceramic electronic component array of claim 1, wherein the first external electrodes of the plurality of multilayer ceramic electronic components contact with each other, and
   the second external electrodes of the plurality of multilayer ceramic electronic components contact with each other.

3. The multilayer ceramic electronic component array of claim 2, wherein the plurality of multilayer ceramic electronic components are stacked in a thickness direction, and
   a direction perpendicular to the second surfaces of the ceramic bodies is a width direction.

4. The multilayer ceramic electronic component array of claim 3, wherein the first ceramic bonding member includes a first extended region disposed to be biased, in a length direction, to one end surface of the second surfaces of each of the ceramic bodies and a second extended region disposed to be biased in another end surface thereof.

5. The multilayer ceramic electronic component array of claim 3, wherein the first ceramic bonding member includes an extended region disposed at a center of the second surfaces of the ceramic bodies in a length direction.

6. The multilayer ceramic electronic component array of claim 5, wherein when an area of the first ceramic bonding member contacting the first surfaces of the ceramic bodies is defined as A and an area of the first ceramic bonding member contacting the second surfaces of the ceramic bodies is defined as B,
   A/B is 1.05 or less.

7. The multilayer ceramic electronic component array of claim 6, wherein at least one portion of the first terminal structure is bent toward the second terminal structure, and
   at least one portion of the second terminal structure is bent toward the first terminal structure.

8. The multilayer ceramic electronic component array of claim 7, wherein the first conductive bonding member includes a first portion contacting a surface of the first terminal structure in the length direction and a surface of the first external electrode, in the length direction, of each of the plurality of multilayer ceramic electronic components, and
   the second conductive bonding member includes a first portion contacting a surface of the second terminal structure in a length direction and a surface of the second external electrode, in the length direction, of each of the plurality of multilayer ceramic electronic components.

9. The multilayer ceramic electronic component array of claim 8, wherein the first conductive bonding member further includes a second portion disposed between the at least one portion of the first terminal structure bent toward the second terminal structure and the first external electrode of an uppermost multilayer ceramic electronic component in the thickness direction, and
   the second conductive bonding member further includes a second portion disposed between the at least one portion of the second terminal structure bent toward the first terminal structure and the second external electrode of the uppermost multilayer ceramic electronic component in the thickness direction.

10. The multilayer ceramic electronic component array of claim 7, wherein portions of the first and second terminal structures are separated from the plurality of multilayer ceramic electronic components.

11. The multilayer ceramic electronic component array of claim 1, wherein
   the plurality of multilayer ceramic electronic components are arranged in "n" numbers in a thickness direction and arranged in "m" numbers in a width direction which is a direction perpendicular to the second surfaces of the ceramic bodies, such that the number of multilayer ceramic electronic components is n times m, and the multilayer ceramic electronic component array further includes a second ceramic bonding member which contacts third surfaces of the ceramic bodies of the multilayer ceramic electronic components arranged in the width direction among the plurality of multilayer ceramic electronic components and extends to fourth surfaces of the ceramic bodies.

12. The multilayer ceramic electronic component array of claim 11, wherein the second ceramic bonding member extends onto the fourth surfaces of the ceramic bodies.

* * * * *